FREQUENCY MODULATED DISCRIMINATOR CIRCUIT

Filed April 21, 1953

INVENTOR
THOMAS C. G. WAGNER

BY Scrivener & Parker
ATTORNEYS

United States Patent Office 2,994,826
Patented Aug. 1, 1961

2,994,826

FREQUENCY MODULATED DISCRIMINATOR CIRCUIT

Thomas C. G. Wagner, Brookdale, Md., assignor, by mesne assignments, to Minneapolis-Honeywell Regulator Company, a corporation of Delaware Filed Apr. 21, 1953, Ser. No. 350,036
2 Claims. (Cl. 328—140)

This invention relates to frequency modulated pulse-type discriminators and frequency indicators and provides such a device of great simplicity and high sensitivity.

In accordance with the invention a limited rectangular wave is supplied to a discriminator or frequency indicator circuit which is so operative that upon negative change in amplitude of the input wave the plate current of a high gain vacuum tube forming part of the circuit is cut off, which condition continues for a pre-determined time until plate current is restored by means forming part of the circuit and which are independent of the driving frequency, thus producing in the plate circuit of the vacuum tube positive pulses of constant width. The circuit also includes means to control the amplitude of the pulses, in order that pulses of constant width and constant amplitude and occurring at the repetition rate of the driving frequency are produced.

In the drawings forming part of this application,

Figure 1:
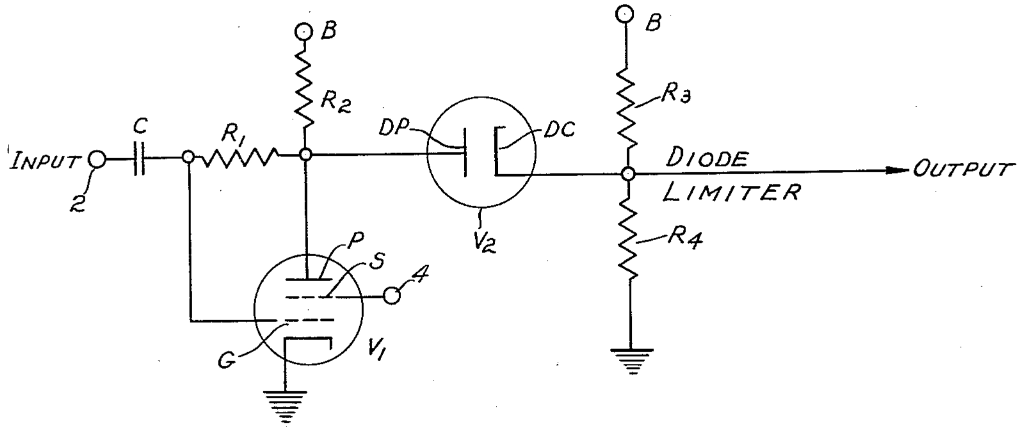
FIG. 1 is a circuit diagram of a frequency discriminator or indicator according to the invention.

The circuit disclosed in this application and illustrated in the drawings is supplied with the driving frequency at input 2 and includes a high gain vacuum tube $V_1$, a capacitor C connected between the input and the grid G of the tube, a resistor $R_1$ connected between the plate P and grid of the tube and a resistor $R_2$ connected between the B supply and the plate of the tube. The screen S of the tube is connected to screen supply 4. The plate of tube $V_1$ is connected to the plate DP of a diode $V_2$ of a diode limiter circuit in which a resistor $R_3$ is connected between the B-supply and the cathode D.C. of $V_2$ and a resistor $R_4$ is connected between ground and a cathode of $V_2$. The resistor $R_2$ performs the normal function of a plate resistor and the resistor $R_1$ and capacitor C determine, in part, the width of the output pulse. The diode limiter circuit limits the magnitude of the output pulse.

Figure 2:
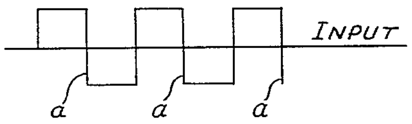
FIG. 2 illustrates the input wave.
Figure 3:
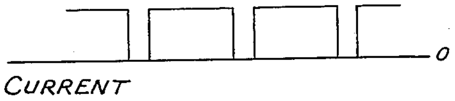
FIG. 3 illustrates the pulses produced in the plate circuit of the vacuum tube and their relation to the input wave.
Figure 4:
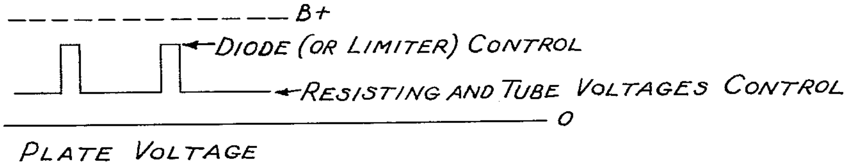
FIG. 4 illustrates the amplitude control of the pulses.

The input to the circuit is a limited rectangular wave at the frequency to be measured. When the amplitude of the input wave decreases, as at *a* in FIG. 2, plate current of tube $V_1$ is cut off, since the instantaneous change in grid voltage is equal to the change in the input. The grid of $V_1$ which is driven negative will decay toward B+ as the capacitor C is recharged by the current flowing through $R_2$ and $R_1$. When the grid of $V_1$ has risen sufficiently, plate current of tube $V_1$ is re-established. The gain of $V_1$ together with the current fed back from the plate of $V_1$ to the grid terminal makes the impedance of the grid terminal appear as $R_1/A+1$, where A is the gain of $V_1$. The plate will then decay toward the grid voltage with a time constant which is A+1 times faster than the previous decay of the grid voltage from a cut-off condition. The plate voltage waveform will therefore consist of a nearly rectangular pulse with rise and fall times which are a small fraction of the width of the pulse. Since, regardless of the frequency, the plate pulse is of constant width and height, the average value of the plate voltage during the pulse is constant, so that the time average of the plate voltage is directly proportional to the number of pulses per second, i.e. the frequency. This relation holds true up to the frequency at which the input reverses before the plate pulse is naturally terminated. At his frequency the average plate voltage saturates. This saturation frequency and the sensitivity of the discriminator may be controlled by the values of $R_1$ and C.

The stability of the discriminator depends upon the stability of the amplitude of the input, the B supply voltage, and the amplitude of the output pulse. If the first two of these are controlled excellent stability will be achieved, because the output pulse will then have an amplitude which is the difference between the B supply and the plate bottoming voltage of the vacuum tube which can normally be made very small. The control of the amplitude of the output pulse is further improved by the addition of a diode limiter in series with the output.

While I have described and illustrated one embodiment of my invention, it will be apparent to those skilled in the art to which the invention relates that other embodiments, as well as modifications of that disclosed, may be made and practiced without departing from the spirit or scope of the invention, for the limits of which reference must be made to the appended claims.

What is claimed is:

1. A frequency responsive system for generating pulses of the same amplitude, width, and shape from the successive cycles of an alternating current input signal of limited rectangular waveform, said system comprising a normally conductive high gain vacuum tube having an input circuit and an output circuit, said input circuit including means responsive to negative changes in the amplitude of said input signal to cut off the conductivity of said tube, means responsive to time interconnecting said input circut and said output circuit to restore said tube to conductivity after a predetermined interval following said negative change, means including said output circuit for deriving voltage signals corresponding to the periods of conductivity and non-conductivity of said tube, and means for limiting the amplitude of said voltage signals.

2. A frequency responsive system for generating successive pulses of the same amplitude, width, and shape from the successive cycles of an alternating current input signal of limited rectangular waveform, said system comprising a normally conductive high gain vacuum tube having an input circuit and an output circuit, said input circuit including means responsive to negative changes in the amplitude of said input signal to render said tube non-conductive, feedback means coupling said output circuit and said input circuit and including time responsive means whereby to restore said tube to conductivity after a predetermined uniform interval of non-conductivity, means including said output circuit for deriving voltage signals corresponding to the periods of conductivity and non-conductivity of said tube and means for limiting the amplitude of said voltage signals.

References Cited in the file of this patent

UNITED STATES PATENTS

| | | |
|---|---|---|
| 2,060,095 | Mathes | Nov. 10, 1936 |
| 2,353,018 | Duke | July 4, 1944 |
| 2,482,803 | Smith et al. | Sept. 27, 1949 |
| 2,651,719 | White | Sept. 8, 1953 |
| 2,740,070 | Ogletree | Mar. 27, 1956 |

OTHER REFERENCES

Duke: Abstract of application Serial No. 565,707, filed Nov. 29, 1944, published 632 O.G. 927, March 21, 1950.